United States Patent [19]

Garcia et al.

[11] 4,017,692
[45] Apr. 12, 1977

[54] TELEPHONE CALL-DIVERTER SYSTEM

[75] Inventors: Mario Garcia, Bridgeport; Robert C. Bell, Manchester, both of Conn.

[73] Assignee: Dictaphone Corporation, Rye, N.Y.

[22] Filed: Aug. 22, 1975
(Under Rule 47)

[21] Appl. No.: 608,692

[52] U.S. Cl. .......................... 179/81 R; 179/18 BE
[51] Int. Cl.² ........................................ H04M 3/54
[58] Field of Search ......... 179/18 BD, 18 BE, 27 F, 179/27 FH, 81 R, 84 R, 84 C, 18 BA, 18 B

[56] References Cited
UNITED STATES PATENTS

| | | | |
|---|---|---|---|
| 2,542,535 | 2/1951 | Kaelin | 179/81 R |
| 3,510,598 | 5/1970 | Ballin | 179/18 BE |
| 3,591,727 | 7/1971 | Shaw | 179/18 BE |
| 3,704,346 | 11/1972 | Smith | 179/18 BE |
| 3,925,622 | 12/1975 | Robinson | 179/18 BE |

Primary Examiner—Kathleen H. Claffy
Assistant Examiner—Joseph A. Popek
Attorney, Agent, or Firm—Arthur V. Smith

[57] ABSTRACT

A telephone call-diverter system for interconnecting an incoming telephone line to an outgoing telephone line so that an incoming telephone call can be transferred to a predetermined remote telephone station. A DC conducting channel is established between the call-diverter system and the incoming telephone line subsequent to the detection of the incoming telephone call, the transmission of dialing signals from the call-diverter system over the outgoing telephone line and a remote station answer condition provided on the outgoing telephone line. In one embodiment, a voice frequency transmission channel is provided in the incoming telephone line connection so that voice frequency communication between the incoming and outgoing telephone lines is provided independent of the completion of the DC connection. Hence, voice frequency signals can be communicated even before the DC connection is established.

12 Claims, 3 Drawing Figures

TELEPHONE CALL-DIVERTER SYSTEM

BACKGROUND OF THE INVENTION

This invention relates to a telephone call-diverter system whereby an incoming telephone call is automatically transferred to a predetermined remote telephone station and, in particular, to an improved system wherein a DC connection is extended to the incoming telephone line only after the remote telephone station answers the transferred call; and wherein an audio frequency signal channel is extended to the incoming telephone line independent of the DC connection.

Telephone call-diverter systems are known wherein apparatus is provided to extend, or forward, an incoming telephone call received at one station to another, predetermined station. Generally, such systems are constructed of numerous electromechanical switching devices, such as relays, solenoids, and the like. It has been found that such electromechanical switching devices exhibit rather limited operating characteristics and often must be replaced or repaired. Hence, such call-diverter systems are subject to frequent maintenence and repair schedules. This, of course, significantly limits the reliability of such systems. Also, with the advent of modern, high-speed telephone switching networks, the electromechanical switching devices admit of operating speeds which are often too slow in comparison with the electronic switching speeds of the telephone networks. This is capable of contributing to erroneous operation of such call-diverter devices.

In other prior art call-diverter systems, the sequence of operations therein are often dependent upon the conditions of the incoming and outgoing telephone lines. For example, operation of the call-diverter is usually initiated in response to an incoming ringing signal. Such call-diverters exhibit the capability of automatically transmitting dialing signals over the outgoing telephone line to thereby establish a connection between the call-diverter station and a predetermined remote telephone station. The successive operations of the call-diverter often are conditioned upon the answering of the transferred call at the remote station. That is, the connection of the call-diverter to the outgoing telephone line will be maintained for an indefinite period so long as the remote station is not answered and the incoming caller persists in retaining his connection to the call-diverter station. It has been found that it would be desirable to provide a predetermined time duration during which the remote telephone station must be answered; and if not then answered, the call-diverter should be restored to its initial, quiescent state.

In some call-diverter systems, the connection between the incoming telephone line and the call-diverter itself is deferred until after the transferred call to the remote telephone station has been answered. This insures that a tariff is not unnecessarily imposed upon the incoming caller for the completion of his call to the call-diverter station when the transferred call cannot be completed — the remote station being "busy" or unattended, or because of other problems attending the telephone switching network. Although such deferred completion to the incoming telephone line is economically favorable, the incoming caller generally is not aware that his call has been received by a call-diverter system and that, for some reason, such call is unable to be successfully transferred. Thus, the incoming caller merely hears the usual ringback signal but does not know why his call is delayed.

One proposed solution has been to connect the incoming line to the call-diverter immediately upon sensing an incoming ringing signal to thereby provide a connection through the call-diverter to the outgoing telephone line. In this manner the caller is not only made aware of the ringback produced in response to his call to the call-diverter system, but he is also enabled to listen to the various supervisory signals accompanying the transfer of his call to the remote telephone station. Hence, he can hear the transmitted dialing signals and the remote station ringback or busy tones, indicating the condition of the remote telephone station. Accordingly, the caller can make the determination of whether the remote station is unattended or is temporarily in use. This information will enable him to formulate his further actions, such as whether and when he should attempt to repeat his call, or whether he should remain coupled to the call-diverter station and permit the continual ringing at the remote station. Unfortunately, such immediate, direct connection between the incoming telephone line and the call-diverter station results in an assessment to the caller for that call. Hence, even though communication with a desired party has not been effected, the calling party, nevertheless, is charged for the "uncompleted" call.

Therefore, it is an object of the present invention to provide an improved telephone call-diverter system that overcomes the aforenoted problems attending prior art systems.

It is another object of the present invention to provide an improved telephone call-diverter system wherein solid-state semiconductor components are employed to perform the various switching and sensing functions.

Yet another object of this invention is to provide an improved telephone call-diverter system wherein the system is returned to an initial, quiescent condition in the event that a call, transferred to a remote station, is not completed within a predetermined interval of time.

A still further object of this invention is to provide an improved telephone call-diverter system wherein a DC connection between an incoming telephone line and the call-diverter system is not completed until the transferred call is answered at the remote station, thereby operating the telephone system tolling apparatus; and wherein a voice frequency channel is also provided between the incoming telephone line and the call-diverter system to thereby enable a caller to perceive the various conditions of the system, regardless of the DC connection.

An additional object of this invention is to provide an improved telephone call-diverter system wherein a selective DC connection between the call-diverter system and an incoming telephone line is shunted by an audio signal transmission connection.

Another object of this invention is to provide an improved telephone call-diverter system wherein the completion of a DC connection between an incoming telephone line and the call-diverter system is inhibited until after the predetermined remote telephone station, to which the incoming call is transferred, is connected to the call-diverter system.

Various other objects and advantages of the present invention will become apparent from the forthcoming detailed description thereof, and the novel features will be particularly pointed out in the appended claims.

SUMMARY OF THE INVENTION

In accordance with the present invention, a telephone call-diverter system is provided for interconnecting an incoming telephone line to an outgoing telephone line so that an incoming telephone call can be transferred to a predetermined remote telephone station which is to be connected to the outgoing telephone line, comprising an outgoing line connecting circuit for connecting the telephone call-diverter system to the outgoing telephone line in response to an incoming telephone call and to permit dialing signals to be transmitted over the outgoing telephone line so that the predetermined remote telephone station can be connected to such outgoing telephone line; an incoming line connecting circuit for providing a DC connection between the call-diverter system and the incoming telephone line; and an inhibit circuit for inhibiting the completion of such DC connection until the predetermined remote telephone station is connected to the outgoing telephone line. In one embodiment, the incoming line connecting circuit is additionally provided with a voice frequency transmission channel connected between the call-diverter system and the incoming telephone line so that voice frequency signals can be transmitted therethrough between the incoming and outgoing telephone lines independent of the completion of the DC connection. In another embodiment of this invention, a timing network is activated in response to an incoming telephone call for restoring the call-diverter system to its initial, quiescent state in the event that the predetermined remote telephone station is not connected to the outgoing telephone line within a predetermined time interval.

BRIEF DESCRIPTION OF THE DRAWINGS

The present invention will best be understood by the following detailed description taken in conjunction with the accompanying drawings in which.

DETAILED DESCRIPTION OF A CERTAIN PREFERRED EMBODIMENT

Figure 1:
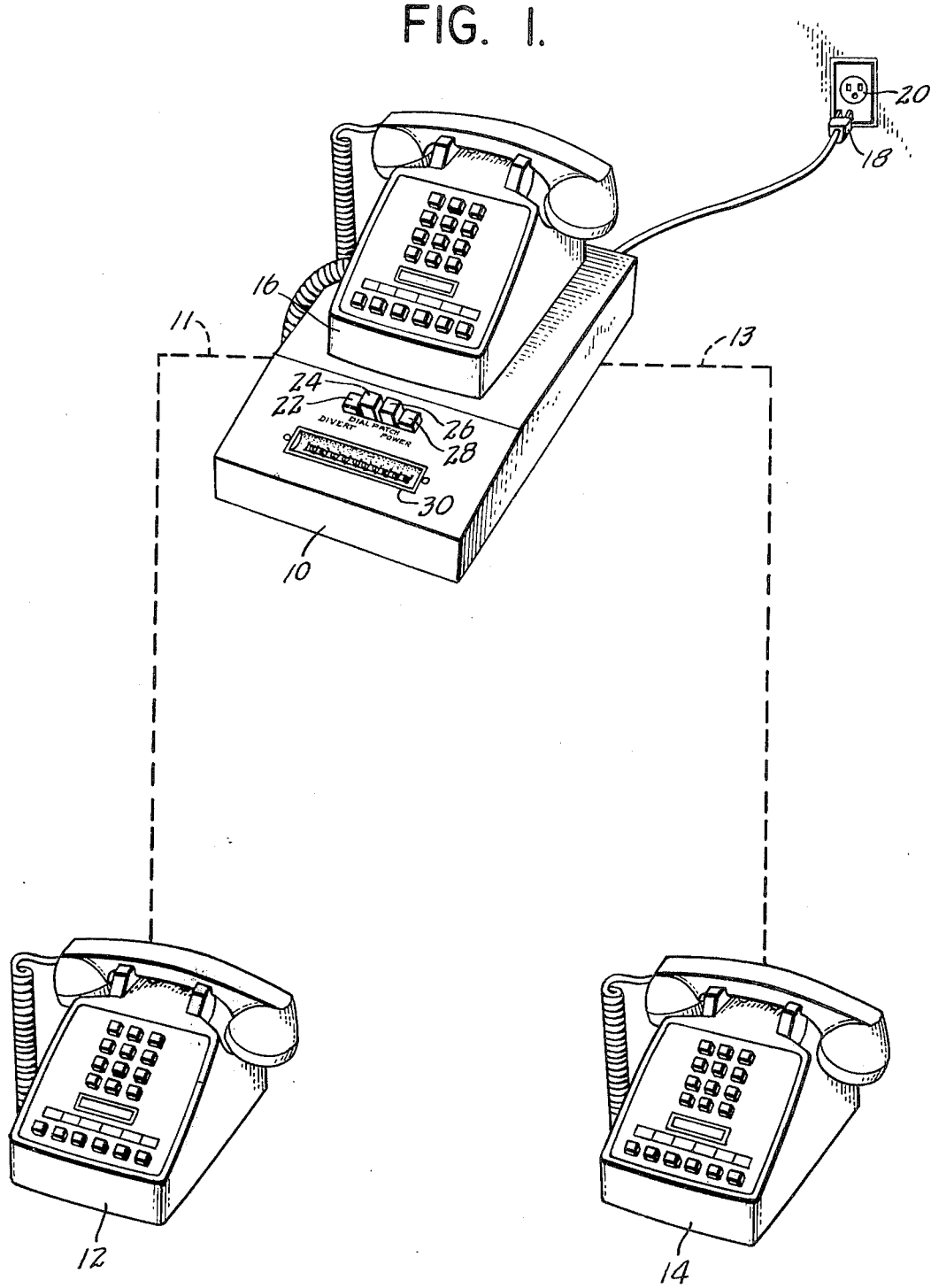
FIG. 1 is a diagramatic representation of the use of a call-diverter system in accordance with the present invention.

Referring now to the drawings and, in particular, to FIG. 1, there is diagramatically represented a call-diverter 10 for interconnecting incoming and outgoing telephone lines whereby an incoming telephone call can be transferred to a predetermined remote station. The call-diverter 10 is adapted to be used at a telephone subscriber's station whereat at least two telephone lines are provided. For example, as shown in FIG. 1, the call-diverter 10 can be used at a station whereat a telephone instrument 16 has four lines connected thereto. If two of those lines are designated as incoming telephone line 11 and outgoing line 13, the call-diverter 10 is connected to such telephone lines by a conventional connector plug, such as a key set telephone connector plug, manufactured by Amphenol. Thus, an incoming telephone call initiated by, for example, a telephone station 12 is transmitted to the call-diverter station via the telephone switching system and is received via the incoming telephone line 11. The call-diverter 10 operates to transfer this incoming telephone call to a predetermined remote telephone station, such as telephone station 14, via the outgoing telephone line 13 and the telephone switching system.

The call-diverter 10 is adapted to be energized by a conventional 110 volt AC supply of 60Hz. Hence, a conventional male connector 18 is adapted to be inserted into a female socket 20, such as the usual wall outlet, to thereby provide the AC energizing voltage over a power lead to the call-diverter.

The call-diverter 10 is adapted to perform various functions which can be selected by the illustrated pushbutton selecting switches 22, 24, 26 and 28. These selecting switches are designated, "DIVERT," "DIAL," "PATCH," and "POWER." The "POWER" switch 28 when actuated, serves to supply the call-diverter 10 with the energizing voltage derived from the aforenoted power supply. Accordingly, as is appreciated, during normal operation, the "POWER" switch 28 is maintained in its depressed condition. Aside from this "POWER" switch, the remaining pushbutton selecting switches 22, 24 and 26 can be interlocked for individual operation. This would tend to insure that only a single function will be selected by a call-diverter operator. The "DIVERT" switch 22, when depressed, permits the call-diverter 10 to transfer an incoming telephone call to a predetermined remote telephone station. Various logic control circuits included in the call-diverter which form no part of the present invention supervise and control the operation of the call-diverter to effect a transferred telephone call. Such circuits serve to detect an incoming ringing signal on the incoming telephone line 11, representing that a caller at, for example, the telephone station 12, desires to communicate with the individual normally disposed at the call-diverter station. If it is assumed that such individual is temporarily located at, for example the telephone station 14 but, nevertheless, wishes to receive all incoming telephone calls directed to the call-diverter station, he would preset the call-diverter to automatically dial the telephone number associated with the station 14 to thereby permit the incoming call to be transferred to that remote station. Since the remote station 14 can be associated with any telephone number, the call-diverter 10 is provided with suitable thumb-wheel switches 30 which are adapted to be operated to determine the predetermined telephone number which is to be automatically dialed by the call-diverter dialing apparatus (not shown). Since the transferred telephone call might be directed to a remote station requiring a different area code from that of the call-diverter station, the thumb-wheel switches 30 are provided with a set of at least 10 digits so that a local telephone number, together with appropriate area code, can be automatically dialed. In addition, a further dialable digit is provided for those applications wherein an access code digit must also be dialed.

After presetting the call-diverter 10 by operating the thumb-wheel switches 30 so that the appropriate digits corresponding to the telephone number of the remote station 14 are displayed, the call-diverter is set to respond to the incoming telephone call to automatically dial the displayed digits. Suitable control circuits, not shown, are included to monitor the condition of the outgoing telephone line 13 so that a dialing operation will be performed under suitable conditions, for example, when a dial tone is detected. Once the remote telephone station 14 has been dialed, the call-diverter 10 is adapted to detect when the remote telephone instrument is answered. At that time, a DC connection is extended between the call-diverter 10 and the incoming telephone line 11 to thereby provide a communication channel from the calling telephone 12, over the incoming telephone line 11 to the call-diverter 10 and thence through the outgoing telephone line 13 to the called telephone station 14. Additional circuits, not shown, are included to detect when the telephone conversation is completed and when one or the other, or both, parties have "hung up." The call-diverter is then restored to its initial, quiescent state to permit a subsequent call diverting operation in response to another incoming telephone call.

The "DIAL" switch 24 is provided so that an operator can use the telephone instrument 16 in the normal fashion, but can effect the automatic dialing of the telephone number which has been preset into the call-diverter 10 by the thumb-wheel switches 30. This automatic dialing operation is similar to that described hereinabove with respect to the call-diverting operation, but is not accompanied by a call-diversion operation. That is, although the preset telephone number is automatically dialed, in the DIAL mode the call-diverter 10 does not connect the incoming and outgoing telephone lines 11, 13 to establish a voice communication channel therebetween. Instead, the call-diverter, which is coupled to the outgoing line 13, merely substitutes an automatic dialing operation for the conventional dialing operation effected through the use of the telephone instrument 16. Conventional dialing signals are thus transmitted to the central station of the telephone switching network via the outgoing line 13 once the "DIAL" switch is depressed. Once such dial signals have been transmitted, the telephone instrument 16 is operated in the normal manner for communication with the dialed telephone station over the telephone line 13. The automatic dialing apparatus included in the call-diverter 10 is conventional and forms no part of the present invention per se. Accordingly, such dialing apparatus may include circuitry for transmitting the conventional "touch-tone" signals or may include circuitry for transmitting DC dialing pulses.

The "PATCH" switch 26 is adapted to add conferencetype capabilities to the telephone instrument 16 to which the call-diverter 10 is coupled. It is recognized that, since two telephone lines 11, 13 are provided in conjunction with the telephone instrument 16, that such instrument can be simultaneously energized such that respective communication channels are extended over these telephone lines simultaneously to two remote stations. In the normal operation of the instrument 16, one of such communication channels will be actively used while the other such channel is in a "stand-by" condition. That is, by depressing an appropriate one of the illustrated handset buttons, the line 11, 13 associated with such handset button is actively used, i.e., voice frequency signals are transmitted thereover; whereas the remaining line associated with another handset button is in the stand-by or "hold" state. When the telephone user now wishes to communicate with the stand-by remote station, the "HOLD" handset button is depressed to thereby place all telephone lines in the stand-by state, and the desired handset button associated with the particular remote station with which the user now wishes to communicate is depressed.

It is appreciated that, unless specific conferencetype auxiliary apparatus is obtained from the telephone operating company, the user of the instrument 16 cannot simultaneously communicate with more than one remote station at any given time. However, the "PATCH" switch provides an audio communication link between the telephone instrument 16 and both telephone lines 11 and 13. Such connection is, preferably, a transformer coupling which forms no part of the present invention per se. However, such interconnection permits the user of the telephone instrument 16 to communicate simultaneously with both remote stations 12 and 14 and, moreover, permits either of such remote stations to communicate simultaneously with the telephone instrument 16 and the other remote station.

Figure 2A:
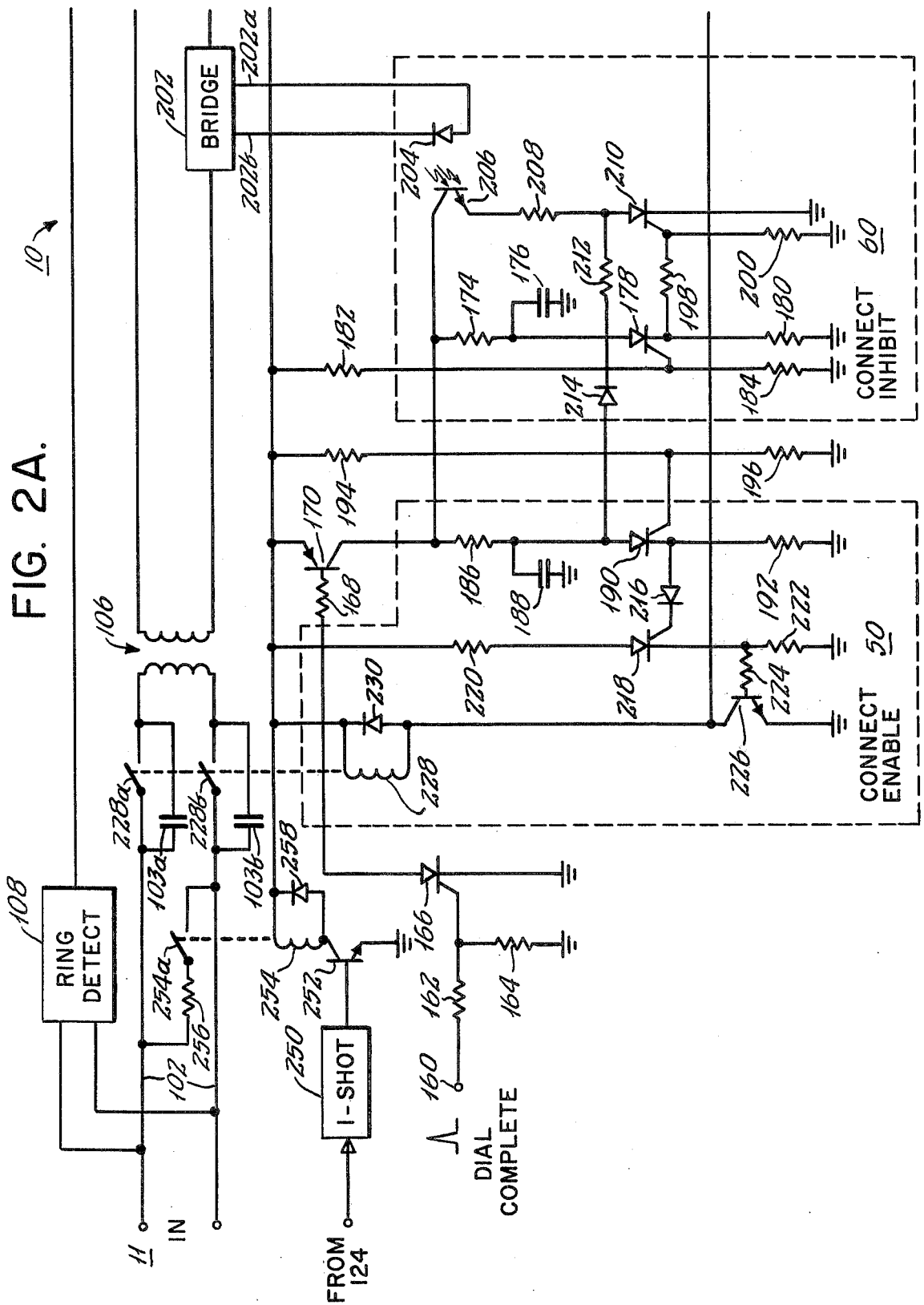
FIG. 2A–2B is a schematic diagram of that portion of the call-diverter system for connecting the incoming and outgoing telephone lines.
Figure 2B:
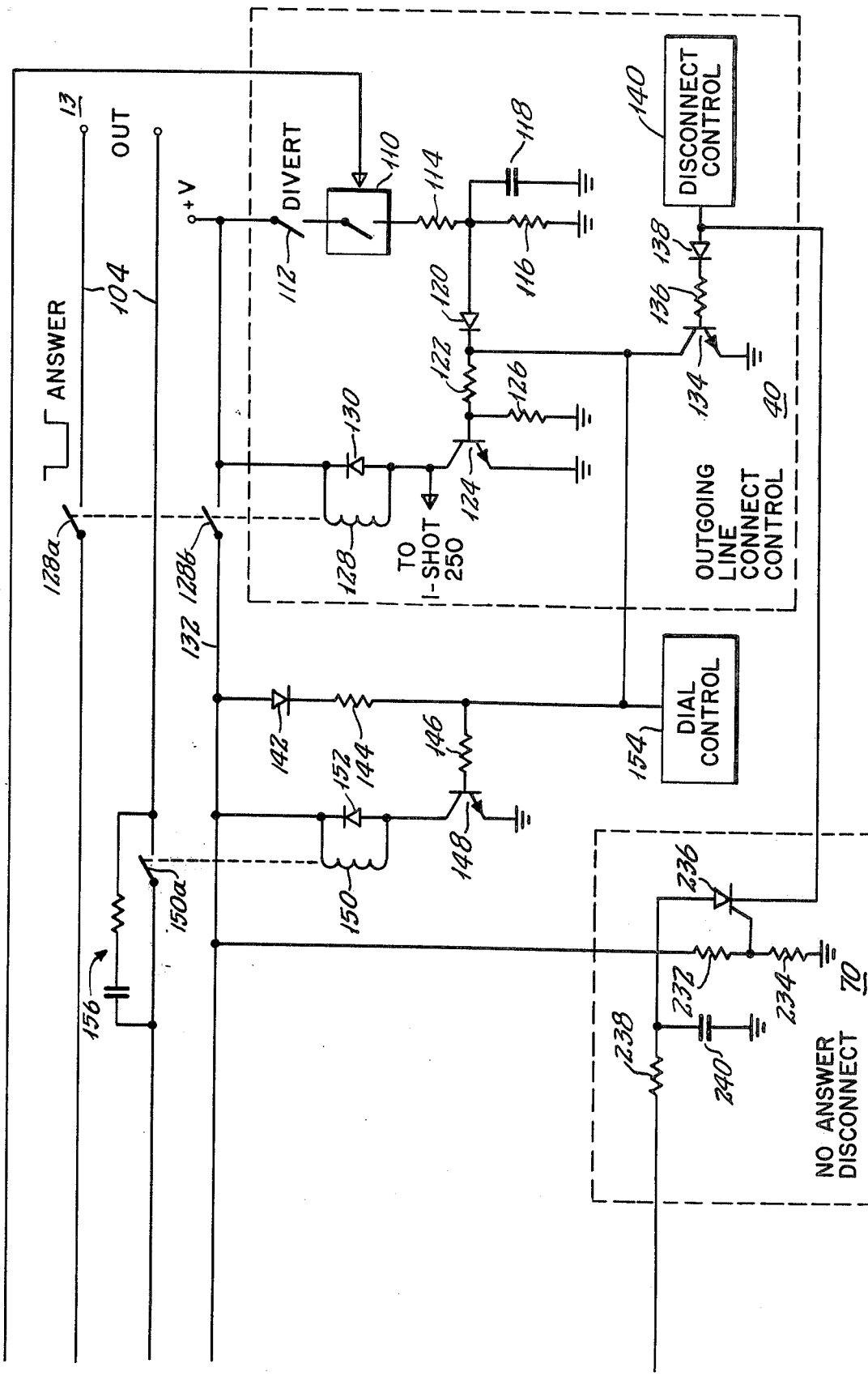

The present invention is directed to apparatus included in the call-diverter 10 for connecting the incoming and outgoing telephone lines 11 and 13 to thereby permit voice frequency communication therebetween when an incoming telephone call originating from, for example, a remote station 12 is directed to the station at which the telephone instrument 16 is disposed and is transferred to the remote station 14, the telephone number of which having been preset into the call-diverter by the thumb-wheel switches 30. A schematic diagram of the switching apparatus in accordance with the present invention is illustrated in FIG. 2. As shown, the call-diverter 10 is coupled to the incoming line 11 and the outgoing line 13, and control circuitry is provided to control the interconnections between the respective lines. In particular, such control circuitry is comprised of outgoing line connecting circuit 40, incoming line connecting circuit 50, an inhibit circuit 60 and an automatic disconnecting circuit 70. As is conventional, the incoming line is formed of a pair conductors 102 and the outgoing line also is formed of a pair of conductors 104. A coupling transformer 106 is adapted to be connected to the incoming and outgoing lines so that voice frequency signals can be transformer-coupled therebetween. Accordingly, one coil of the coupling transformer 106 is disposed to be connected to the incoming conductors 102 and the other coil of the transformer is disposed to be connected to the outgoing conductors 104. Those of ordinary skill in the art will recognize that, in a conventional telephone switching system, an incoming telephone line is siezed in response to an incoming ringing signal by providing a suitable line terminating impedance to thereby establish a DC connection to the incoming line. Such terminating impedance causes the ringing signal to terminate and, moreover, initiates the operation of the usual tolling apparatus, whereby an appropriate tariff can be levied upon the caller. Additionally, the terminating impedance permits appropriate supervisory signals and audio signals to be transmitted.

It has been found that if a DC terminating impedance is not provided, but if an AC, audio frequency transmission channel is connected in series with the incoming line conductors 102, an incoming telephone call will not initiate the central office tolling apparatus, but, nevertheless, in some central office equipment, voice frequency signals can be transmitted. In that event, the usual ringing signals and other supervisory tones that normally are provided on the telephone lines can be heard by the caller. Speech communication can be superposed on such ringing and supervisory signals, without energizing the tolling apparatus. However, such superimposed communication can be quite annoying and it is preferable to provide the conventional DC terminating impedance once a call transfer operation has been completed, to thereby permit clear voice communication between the calling and called stations. To this effect, RC voice frequency transmission channels formed of capacitor 103a and resistor 105a, and capacitor 103b and resistor 105b are connected in series between the incoming line conductors 102 and the coupling transformer 106. In addition, switching contacts 228a and 228b which, for example, may comprise electromechanical switches, such as relays, solenoids or the like, are connected between the incoming line conductors 102 and the coupling transformer 106. As shown, the audio signal RC coupling circuits are connected in by-pass relation to the electromechanical switches. It should be appreciated that, once such electromechanical switches are closed, a DC connection is extended between the coupling transformer 106 and the incoming line conductors so that the incoming telephone line is suitably terminated with the appropriate DC terminating impedance. Hence, as is expected, an incoming ringing signal is continued until the electromechanical switches are closed, at which point a DC path is established between the originating calling party and the call-diverter, and the usual telephone call tolling apparatus is energized.

The coupling transformer 106 is adapted to be connected to the outgoing line conductors 104 by the closing of the switching contact 128a. Such switching contract may comprise an electromechanical switch such as, for example, a relay contact, a solenoid, or the like. The outgoing line conductors are further connected to the coupling transformer by the dialing signal transmission circuit, comprised of the R-C filter 156 connected in parallel with a dialing switch contact 150a and a series-connected bridge circuit 202. It is appreciated that, when the switches 128a and 150a are both closed, a DC channel is established between the outgoing line conductors 104 and the coupling transformer 106. Dialing signals can be transmitted over the outgoing line conductors to the telephone switching office connected thereto by applying suitable DC pulses to the outgoing line or by applying appropriate "touch tone" signals to the line. In one embodiment wherein the present invention finds ready application, the dialing signals are formed of DC pulses and are generated by periodically interrupting the DC connection between the outgoing line and the coupling transformer 106 as by periodically opening and closing the switch 150a.

The bridge circuit 202 is adapted to rectify AC signals supplied thereto and, moreover, to produce a DC voltage of given polarity in response to a supervisory DC voltage applied thereto. Accordingly, the bridge circuit 202 is conventional and may comprise a fullwave rectifier having four bridge arms each formed of a rectifier circuit, and wherein a pair of such bridge arms include Zenner diodes. Hence, when direct current flows through the outgoing line conductors 104 and thus through the bridge circuit 202, the direct current flows from the bridge output terminal 202a to the bridge output terminal 202b. This derived direct current output is turned to account by the control circuitry of the present invention, as will soon be described.

The outgoing line connecting circuit 40 is adapted to close the switch 128a in response to an incoming ringing signal received over the incoming line conductors 102 to thereby complete a circuit between the coupling transformer 106 of the call-diverter and the outgoing telephone lines. Accordingly, this outgoing line connecting circuit is comprised of a ring detecting circuit 108, a relay energizing coil 128 and a relay driver transistor 124. The ring detecting circuit 108 is connected to the incoming line conductors 102 and is adapted to provide an output signal when a ringing signal is detected on the incoming line. Accordingly, the ring detecting circuit may comprise a conventional tuned circuit having an output terminal coupled to an energizable switch 110. This energizable switch, which may comprise a transistor switch, or the like, is responsive to an energizing signal applied thereto for completing a conducting path therethrough. The switch 110 is connected in a series circuit extending from a source of energizing potential ±V and including a manually operable "DIVERT" switch 112 and divider resistors 114, 116 to a reference potential, such as ground. The "DIVERT" switch 112 may be the aforedescribed "DIVERT" switch 22 which is operated when a calldiverting operation is desired. It is appreciated that, when the switch 110 is energized, current flows through the aforenoted series circuit to derive a suitable bias potential across the resistor 116. A bias capacitor 118 is connected in parallel with this resistor.

The junction defined by the divider resistors 114 and 116 is coupled to the base electrode of the relay driver transistor 124 by the diode 120 and the current limiting resistor 122. In addition, a bias resistor 126 is connected in parallel with the base-emitter circuit of the relay driver transistor. The collector electrode of the transistor 124 is connected to one side of the relay energizing coil 128, the other side of which is connected to the source of energizing potential +V. As is conventional, a damping diode 130 is connected in parallel with the energizing coil. Accordingly, current is permitted to flow through the energizing coil 128 when the relay driver transistor 124 is rendered conductive. When so energized, the relay energizing coil effects the closing of the switch 128a and, additionally, the switch 128b. As shown, the latter switch is connected to the source of energizing potential +V and, when closed, enables the energizing potential to be supplied therethrough to a power supply output terminal for energizing additional circuitry to be described.

The conductivity of the relay driver transistor 124 is further controlled by a transistor 134 having its collector-emitter circuit coupled between the base biasing circuit of the transistor 124 and ground. In the illustrated embodiment, the collector electrode of the transistor 134 is connected to the current limiting resistor 122. Operating potential is supplied to the collector electrode of the transistor 134 from the power supply output terminal 132 by a diode 142 connected in series with a current limiting resistor 144. It is appreciated that, when the transistor 134 is rendered conductive, the base biasing potential of the relay driver transistor 124 is shunted to ground so as to render the transistor 124 nonconductive. Control of the conductivity of the transistor 134 is obtained from the automatic disconnect circuit 70 and by a disconnect logic control circuit 140. These respective circuits are connected in common to the base electrode of the transistor 134 by a diode 138 and a base resistor 136. When either the automatic disconnect circuit 70 or the disconnect logic control circuit 140 produces a biasing potential capable of rendering the transistor 134 conductive, the outgoing line connecting switch 128a is opened to thereby disconnect the coupling transformer 106 of the call-diverter from the outgoing line conductors 104.

The operation of the automatic disconnect circuit 70 will be described in detail hereinbelow. The disconnect logic control circuit 140 forms no part of the present invention per se and, therefore, in the interest of brevity, detailed description thereof need not be provided. However, it may be noted that the disconnect logic control circuit monitors the telephone line conditions and serves to initiate a disconnect operation upon the conclusion of the diverted telephone conversation. Hence, suitable logic circuitry is provided to sense when the calling and/or called party has "hung up."

It is recalled that the switch 150a connected in the DC path extending between the coupling transformer 106 of the call-diverter and the outgoing line conductors 104 is periodically opened and closed to effect the transmission of dialing signals to the telephone switching network connected to the outgoing telephone lines. Such pulsing of the dialing switch 150a is controlled by a relay energizing coil 150 and a relay driver transistor 148. The collector-emitter circuit of the driver transistor 148 is connected between ground and one side of the relay energizing coil 150. The other side of the relay energizing coil is connected to the power supply output terminal 132. Additionally, as is conventional, a damping diode 152 is connected in parallel with the relay energizing coil. The base electrode of the relay driver transistor 148 is adapted to receive suitable biasing potentials to determine the conductivity of the driver transistor, whereby the opening and closing of the switch 150a is determined. Accordingly, the base electrode of the relay driver transistor is coupled, via a current limiting resistor 146 to a dial logic control circuit 154. The current limiting resistor 146 is additionally supplied with a bias potential from the power supply output terminal 132 via the aforedescribed series circuit formed of the diode 142 and the resistor 144.

The dial logic control circuit 154 forms no part of the present invention per se, and is provided to effect the automatic dialing of a predetermined remote telephone number. Accordingly, such logic control circuit includes the aforedescribed thumb-wheel switches 30 which are preset to such predetermined telephone number. In addition, control circuits are provided to selectively control the conductivity of the relay driver transistor 148 once a dial tone is provided on the outgoing lines so that the preset telephone number is automatically dialed. It is appreciated that, when the relay driver transistor 148 is rendered conductive, energizing current flows through the relay energizing coil 150 to thereby close the dialing switch 150a. Conversely, when the driver transistor is rendered nonconductive, current no longer flows through the relay energizing coil and the dialing switch 150a is open. Thus, by supplying suitable dialing pulses to the base electrode of the relay driver transistor 148, the dialing switch 150a is pulsed in a corresponding manner to thereby transmit dialing signals to the telephone system central office. As is appreciated, the dial logic control circuit 154 may, for example, selectively switch a suitable impedance to the current limiting resistor 146 such that, when such impedance is connected thereto, a biasing potential adapted to render conductive the transistor 148 is derived, and when such impedance is removed, the resultant bias potential applied to the transistor 148 is not sufficient to maintain its conductivity. Of course, various alternative embodiments of dial logic control circuits can be provided. Similarly, the dialing switch 150a may be connected such that it is opened when the transistor 148 is energized and is closed when the transistor is de-energized.

The incoming line connecting circuit 50 is adapted to close the line connecting switches 228a and 228b upon the completion of the automatic dialing operation. Accordingly, the incoming line connecting circuit is comprised of a dial completion detecting switch 166, switches 190 and 218, a relay energizing coil 228 and a relay driver transistor 226. The dial completion detecting switch 166 comprises a solid-state switch formed of a semiconductor device such as a controlled rectifier, a transistor, or the like. In the illustrated embodiment, the dial completion detecting switch is preferably formed of a silicon controlled rectifier, (hereinafter SCR) having its control, or gate, electrode coupled to an input terminal 160 via biasing resistors 162 and 164, as illustrated. The anodecathode circuit of the SCR 166 is connected between ground and the base electrode of a transistor 170 via a base resistor 168. The gate electrode of the SCR is adapted to receive an energizing pulse supplied thereto from the input terminal 160 by the biasing resistors. This energizing pulse is preferably of positive polarity and is produced by the dial logic control circuit 154 upon the completion of an automatic dialing operation. The specific circuits employed to produce such an energizing pulse form no part of the present invention and, therefore, need not be described in further detail. As those of ordinary skill in the art will recognize, an SCR is rendered conductive when an energizing pulse of suitable polarity is applied between the gate and cathode electrodes. If the anode current of the now conducting SCR remains in excess of the predetermined holding current, the SCR will maintain its conductivity. However, once the anode current drops below such holding current, the SCR is "turned off." It is appreciated that, when actuated, the SCR 166 is adapted to apply ground potential therethrough to the base electrode of the transistor 170 via the base resistor 168.

The transistor 170 is illustrated as a pNP transistor having its emitter electrode connected to the power supply output terminal 132. Consequently, as is appreciated, the transistor 170 is rendered conductive when a ground potential is applied to the base electrode thereof. The emitter-collector circuit of the transistor 170 is connected to a time delay circuit formed of the resistor 186 connected in series with the capacitor 188, the latter being further connected to ground. It is appreciated that the charging time required to charge the capacitor 188 to a given voltage level through the transistor 170 is a function of the R-C time constant of the illustrated charging circuit. The junction defined by the resistor 186 and the capacitor 188 can be considered to be the output terminal of the charging circuit. This charging circuit output terminal is coupled to a solid-state switch, such as a programmable unijunction transistor (PUT) or an SCR 190, to actuate such switch when the charging circuit has been charged to a predetermined level. As shown, the anode-cathode circuit of the SCR 190 is connected between the charging circuit output terminal and ground, and further includes the cathode resistor 192. The gate electrode of the SCR is supplied with a constant bias voltage derived from the voltage divider network formed of the series resistors 194 and 196 connected across the power supply output terminal 132. It may be appreciated that, although a constant bias potential is supplied to the gate electrode thereof, the SCR 190 is not acutated to its conductive state until the anode voltage thereof attains a sufficiently high voltage. Thus, when the charging circuit is charged to the aforenoted predetermined level, the SCR 190 is actuated to its conducting state, and the charged level reached by the charging circuit is transmitted through the SCR to its cathode electrode. The cathode electrode of the SCR 190 is coupled to the control electrode of a further actuable switch 218 by a diode 216.

The actuable switch 218 is illustrated as an SCR having its anode-cathode circuit connected in series between the power supply output terminal 132 and ground. The series circuit includes an anode resistor 220 and a cathode resistor 222. The SCR 218 is adapted, when actuated in response to a suitable bias potential applied to the gate electrode thereof, to become conductive so that the anode voltage thereof is transmitted to the cathode electrode. This cathode electrode, as shown, is connected to the base electrode of relay driver transistor 226 via the base resistor 224. The collector electrode of the relay driver transistor is connected to one side of a relay energizing coil 228, the other side of which is connected to the power supply output terminal 132. In addition, a conventional damping diode 230 is connected in parallel with the relay energizing coil.

In addition to being connected to the afore-described charging circuit, the collector electrode of the transistor 170 is connected, via conductor 172, to another charging circuit and to a switching device 206. This second charging circuit is similar to the first-described charging circuit and includes a resistor 174 connected in series with a capacitor 176, the latter being further connected to ground. However, the resistance and/or capacitance values of the second charging circuit are such that the R-C time constant of resistor 174 and capacitor 176 is smaller than the R-C time constant of the resistor 186 and the capacitor 188. Consequently, if both charging circuits are supplied with the same energizing potential simultaneously, the capacitor 176 will be charged to the aforenoted predetermined level before the capacitor 188 is so charged.

The output terminal of the charging circuit formed of the resistor 174 and the capacitor 176 is connected to the solid-state switch 178. This switch is formed of a PUT or an SCR similar to the afore-described switch 190 and, as shown, includes a gate electrode connected to a voltage divider circuit formed of the resistors 182 and 184 connected across the power supply output terminal 132. In addition, the anode electrode of the SCR 178 is connected to the output-terminal defined by the junction formed of the resistor 174 and the capacitor 176; the cathode of the SCR being coupled to ground by the cathode resistor 180. Thus, although a constant bias potential is applied to the gate electrode of the SCR 178, this device will not be actuated to its conducting state until the charging circuit formed of the resistor 174 and the capacitor 176 is charged to the aforenoted predetermined level. At that time, the anode voltage of the SCR 178 will be sufficient so that, when considered in conjunction with the gate bias potential, the SCR will "fire" i.e., be actuated to its conducting state.

The cathode of the SCR 178 is coupled, via resistor 198, to the control electrode of a solid-state actuable switch 210. This switch is also formed of an SCR having a gate biasing resistor 200 extending between the gate electrode and ground. The SCR 210 is adapted to respond to an actuating voltage supplied to the gate electrode so as to be driven to its conducting state. It is recognized that, when conducting, the anode-cathode circuit of the SCR 210 is essentially a short circuited conducting path. As shown, the anode is coupled to the output terminal of the charging circuit formed of the resistor 186 and the capacitor 188 by the series circuit formed of the resistor 212 and the diode 214. The cathode of the SCR 210 is coupled to ground. Hence, as is appreciated, when the SCR 210 fires, a conducting path extends from the output terminal of the first-named charging circuit through the diode 214, the resistor 212 and the now-conducting SCR 210 to ground. The anode of the SCR is adapted to be supplied with sufficient operating voltage from the conductor 172 through the switching device 206 and series-connected resistor 208.

The switching device 206 is adapted to provide a normally conducting channel between the conductor 172 and the SCR 210 except when a predetermined condition is provided on the outgoing telephone line. In particular, the switching device 206 is normally closed except when the remote telephone station coupled to the outgoing telephone lines responds, i.e. answers the transferred call. When such transferred call is answered, the remote telephone instrument goes "off-hook," whereby the telephone switching network provides a negative going answer pulse to the outgoing line conductors 104 admitting of at least a minimum duration. This negative answer pulse is detected and causes the normally closed switching device 206 to open, that is, to become non-conductive. In the illustrated embodiment, the switching device 206 comprises a phototransistor in combination with a light emitting diode 204. However, it should be readily apparent that various other conventional switching elements can be used to perform the function now to be described.

In the absence of a negative pulse on the outgoing line conductors 104, the bridge circuit 202 normally provides a direct current from the bridge output terminal 202a through the light emitting diode 204 to the bridge output terminal 202b Such direct current flow through the light emitting diode results in the transmission of light from such light emitting diodes to the phototransistor 206 which is in light receiving relationship with respect to the LED. As is recognized, light impinging upon the phototransistor causes that phototransistor to become conductive, thereby establishing a conducting path from the collector to the emitter thereof. Hence, when so conducting, the operating voltage applied to the conductor 172 is transmitted through the conducting phototransistor 206 and through the emitter resistor 208 to the SCR 210. Since the anode of the SCR is thus supplied with an operating voltage, this SCR fires when a suitable actuating bias potential is applied to its gate electrode. However, when the negative answer pulse is applied to the outgoing line conductors 104, no direct current flows between the bridge circuit output terminals 202a and 202b for the duration of such answer pulse. Consequently, the light emitting diode 204 is not actuated and light is not emitted therefrom to impinge upon the phototransistor 206. Accordingly, the phototransistor is no longer conductive and the conducting path which had previously been established between the collector and emitter electrodes thereof is interrupted. Consequently, the operating potential previously supplied from the conductor 172 to the anode of the SCR 210 is removed. It is appreciated that a negative-going answer pulse that is of approximately ground potential will have the foregoing results.

The automatic disconnect circuit 70 is adapted to cause the automatic opening of the outgoing line connecting switch 128a in the event that the called telephone station to which the incoming call is transferred does not respond to such transferred call within a predetermined time interval. Accordingly, the automatic disconnect circuit is comprised of a timing circuit formed of a resistor 238 connected in series with a capacitor 240, the latter being connected to ground. An operating voltage is supplied to this timing circuit from the power supply output terminal 132 and through the relay energizing coil 228. Hence, as is shown, the timing circuit is connected to the collector electrode of the relay driver transistor 226.

The output terminal of the timing circuit is defined by the junction formed by the resistor 238 and the capacitor 240 and is connected to a solid-state actuable switch 236. This actuable switch 236 may comprise a PUT or may be described as a controlled rectifier, such as an SCR, having its anode connected to the timing circuit output terminal and its cathode connected through the diode 133 and the resistor 136 to the base circuit of the transistor 134. The gate electrode of the SCR 236 is supplied with a constant bias potential connected across the power supply output terminal 132. Accordingly, the connection between the SCR 236 and the timing circuit is seen to be substantially similar to the afore-described connections between the SCRs 178 and 190, respectively, and the charging circuits formed of resistor 174 and capacitor 176 and resistor 186 and capacitor 188, respectively. Therefore, when the timing circuit formed of the resistor 238 and capacitor 240 is charged to a predetermined level, the SCR 236 fires to supply the base electrode of the transistor 134 with the predetermined level to which the capacitor 240 had been charged. However, if, prior to attaining this predetermined level, the transistor 226 is actuated, as by the detection of the answer pulse on the outgoing telephone line, the transistor 226 is rendered conductive to now couple ground potential to the timing circuit, In that event, the voltage to which the capacitor 240 had been charged, now discharges through the resistor 238 and through the collector-emitter junction of the transistor 226 to ground. Consequently, the SCR 236 is not fired and the transistor 134 is not rendered conductive thereby.

The operation of the illustrated interconnecting apparatus and the control circuitry therefor will now be described. Let it be assumed that the "DIVERT" switch 22 (FIG. 1) had been depressed to thereby close the switch 112. Let it be further assumed that the telephone number corresponding to the predetermined remote telephone station 14 had been preset into the dial logic control circuit 154 by the suitable manipulation of the thumb-wheel switches 30. Now, if a calling party wishes to communicate with the individual normally located at the call-diverter station, an incoming ringing signal will be extended from the telephone system central office over the incoming line conductors 102. As is conventional, the calling party will listen to the ringback signals returned to his instrument and to various supervisory signals that might be applied to the telephone line. However, since the line connecting switches 228a and 228b admit of their normally open condition, the incoming line conductors 102 will not be terminated in a DC terminating impedance and the incoming ringing signal will not cease, nor will the telephone system tolling apparatus be activated. However, the RC audio coupling circuits which by-pass the line connecting switches will permit voice frequency signals to be transmitted therethrough; thereby enabling the calling party in some telephone central office equipment to listen to those signals that are further applied to the outgoing line conductors 104.

The incoming ringing signal will be detected by the ring detector circuit 108 to thereby actuate the switch 110. When this switch closes in response to the detection of the ringing signals, direct current flows from the source of operating potential +V through the closed "DIVERT" switch contact 112, through the closed switch 110 through the voltage divider resistors 114, 116 to ground. Consequently, a relatively positive bias potential is supplied from the resistor 116 through the diode 120 and the base resistor 122 to the base electrode of the transistor 124. This relatively positive bias potential is sufficient to render the transistor 124 conductive, thereby permitting direct current to flow from the source of operating potential through the relay energizing coil 128 and through the conducting transistor 124 to ground. As thus energized, the relay coil 128 causes the outgoing line connecting switch 128a to close to thereby establish a connection between the outgoing line conductors 104 and the coupling transformer 106 via the closed outgoing line connecting switch 128a, the bridge circuit 202 and the R-C circuit 156. The energized relay coil 128 further causes the contact 128b to close, thereby supplying the power supply output terminal 132 with the operating voltage +V.

At this time, the transistor 134 admits of its non-conducting state, and the base-emitter circuit of the relay driver transistor 124 is not shunted to ground.

Once the relay contact 128b is closed to supply the power supply output terminal 132 with the operating voltage +V, a suitable bias potential is supplied through the diode 142 and the resistors 144 and 146 to the base electrode of the transistor 148. If desired, such bias potential can be withheld from the transistor 148 until a dial tone on the outgoing line conductors 104 is sensed. In any event, the bias potential supplied to the base electrode of the transistor 148 is sufficient to render that transistor conductive, thereby permitting energizing current to flow from the power supply output terminal 132, through the relay energizing coil 150 and through the collector-emitter circuit of the transistor 148 to ground. As thus energized, the relay coil 150 causes the dial pulsing relay 150a to close. Consequently, a DC channel is extended between the outgoing line conductors 104 and the coupling transformer 106 of the call-diverter. The relative conductivity of the transistor 143 is now dependent upon the dial logic control circuit 154 which controls the bias potential applied to the base electrode of the transistor. In particular, this bias potential admits of a pulsed waveform configuration, thereby resulting in the pulsing of the dialing relay 150a. The predetermined telephone number that had been preset by the thumb-wheel switches 30 is thus dialed.

Once the relay contact 128b is closed, the timing circuit included in the automatic disconnect circuit 70 begins to charge. That is, direct current now flows from the power supply output terminal 132, through the relay energizing coil 228, and through the resistor 238 to the capacitor 240. The rate at which the capacitor 240 charges is determined by the R-C characteristics of the illustrated timing circuit. If, after a predetermined interval of time subsequent to the closure of the relay contact 128b in response to detecting the incoming ringing signal, an answer pulse is not applied to the outgoing line conductors 104, the capacitor 240 will charge to a predetermined level to thereby fire the SCR 236. Once fired, the charged level attained by the capacitor 240 is coupled through the now conducting SCR and through the diode 138 and resistor 136 to the base electrode of the transistor 134. This transistor will now be rendered conductive to effectively shunt the bias potential derived across the resistor 116 to ground. Since ground potential is now applied to the base electrode of the transistor 124, this transistor is no longer conductive and the relay coil 138 is de-energized. Consequently, the outgoing line connect switch 128a as well as the relay contact 128b open to disconnect the call-diverter from the outgoing line conductors. Whatever circuit connections had been established between the call-diverter and the telephone switching system are thus broken and the call-diverter is returned its initial, quiescent condition. That is, the capacitor 240 is discharged through the SCR 236 until the anode voltage is no longer sufficient to maintain the necessary holding current. At that time, the SCR 236 is rendered nonconductive and the transistor 134 is likewise rendered nonconductive. However, the resistance and capacitance values of the timing circuit included in the automatic disconnect circuit 70 are selected to exhibit a relatively high R-C time constant. In particular, such R-C time constant is high enough to provide sufficient time for the completion of an automatic dialing operation and to permit a reasonable time for the called party to now respond to the transferred call.

At the completion of the dialing cycle, a positive bias pulse is applied to the input terminal 160 and is coupled to the gate electrode of the SCR 166. Consequently, this SCR fires and establishes a conductive path between the base electrode of the transistor 170 and ground. Accordingly, the transistor 170 now is suitably biased to its conductive state. It will be understood that sufficient holding current is supplied through the SCR 166, thereby avoiding the necessity of a constant actuating signal applied to the gate electrode. Hence, as the SCR 166 is maintained in its conducting state, the transistor 170 is likewise conductive.

Energizing voltage is now supplied from the power supply output terminal 132 through the transistor 170 to both of the charging circuits formed of resistor 174 and capacitor 176 and resistor 186 and capacitor 188, respectively. Accordingly, both capacitors 176 and 188 are charged at the respective rates determined by the respective R-C time constants. As described above, the capacitor 176 will be charged at a faster rate than the capacitor 188. Therefore, since the capacitor 176 is the first to attain its predetermined charge level, the SCR 178 fires before the SCR 190. This, of course, is due to the constant bias potential applied to the gate electrode of the SCR 178 and the sufficient anode voltage applied by the capacitor 176. The sudden conductivity of the SCR 178 results in a sudden increase in the cathode voltage thereof, thereby supplying an energizing pulse to the gate electrode of the SCR 210.

Since an answer pulse has not yet been applied to the outgoing line conductors 104, it is appreciated that the LED 204 continues to emit light which impinges upon the phototransistor 206. Hence, the phototransistor 206 conducts to thereby supply operating voltage from the power supply output terminal 132, through the transistor 170, through the phototransistor 206 to the anode of the SCR 210. When supplied with the energizing voltage, the SCR 210 fires to now establish a conducting channel to ground from the capacitor 188, through the diode 214, through the resistor 212 and through the anode-cathode circuit of the SCR. Thus, it is seen that, since the capacitor 176 attains its predetermined level prior to the capacitor 188, the SCR 210 is actuated to clamp the charging circuit formed of the resistor 186 and the capacitor 188 to approximately ground potential. Consequently, this charging circuit is inhibited from charging to the aforenoted predetermined level, and the SCR 190 is maintained in its non-conducting state.

It may be noted that, when the SCR 178 fires, the voltage level to which the capacitor 176 is charged is discharged through the SCR. If the capacitor discharges below the level necessary to sustain a holding current, the SCR 178 is rendered nonconductive, i.e., turned off. This, of course, removes the actuating potential from the gate electrode of the SCR 210. However, as is the characteristic feature thereof, the SCR 210 will not be turned off because the predetermined holding current level therethrough is exceeded. Now, once the SCR 178 has been turned off, the capacitor 176 is again charged to its predetermined level, sufficient to again fire the SCR. Therefore, notwithstanding the actuating pulses that are applied through the SCR 178 to the gate electrode of the SCR 210, the latter SCR is substantially continually conducting so as to maintain a clamp of approximately ground potential on the capacitor 188.

Now, once the called party at the remote telephone station has responded to the transferred call, the telephone system switching network returns the aforedescribed answer pulse to the outgoing line conductors 104. This answer pulse is effective to terminate the current flowing through the LED 204 throughout the time duration thereof. Consequently, light no longer impinges upon the phototransistor 206 and this phototransistor now is rendered nonconductive. Current no longer flows therethrough to the anode of the SCR 210. Holding current can no longer be supplied through the SCR 210 and the device is thus rendered nonconductive to thereby remove the ground potential clamp from the capacitor 188. Now that the capacitor 188 no longer is inhibited from charging to its predetermined level, the capacitor is so charged until a sufficient voltage is provided at the anode of the SCR 190. When this is achieved, the SCR fires to produce an energizing pulse at the cathode thereof. This is similar to the aforedescribed operation of the SCR 178.

The actuating pulse produced at the cathode of the SCR 190 is coupled to the gate electrode of the SCR 218 by the diode 216 to thereby fire the SCR 218. Current now flows from the power supply output terminal 132, through the anode resistor 220, through the SCR 218 and through the cathode resistor 222 to ground. This supplies a relatively positive bias potential to the base electrode of the relay driver transistor 226, thereby rendering this transistor conductive. Energizing current now flows from the power supply output terminal 132 through the relay energizing coil 228 and through the transistor 226 to ground. When so energized, the incoming line switches 228a and 228b are closed to thereby establish a DC connection between the incoming line conductors 102 and the coupling transformer 106. A DC terminating impedance is thus coupled to the incoming line to thereby terminate the ringing signal and to initiate the telephone system tolling apparatus.

It is recognized that, when the transistor 226 is rendered conductive, the voltage to which the capacitor 240 included in the timing circuit of the automatic disconnect circuit 70 has been charged is now permitted to discharge through the transistor. By so discharging, the SCR 236 is not provided with a sufficient operating voltage and is thus not fired. It should be appreciated that, although the capacitor 240 is charged by a current flowing through the relay energizing coil 228 while the transistor 226 is deenergized, the resistance value of the resistor 238 is large enough to limit the charging current to a value that is not sufficient to energize the relay coil. Hence, notwithstanding this charging current, the incoming line connected switches 228a and 228b are not closed until the relay driver transistor 226 is energized.

It is recognized that, while the incoming ringing signal is applied to the incoming telephone line and while the aforedescribed operation of the call-diverter is in process, the dial tone, dialing signals and ringback present at the outgoing telephone line conductors 104 are transmitted through the coupling transformer 106 and through the audio signal RC coupling circuits, and through some central office equipment, to the calling party. Thus, in addition to perceiving the usual ringback signal when the call-diverter station is called, the calling party is also apprised of the call transferring operation attending the dial tone, dialing signal and remote ringback signal that are sensed. Therefore, in the event that the remote called telephone station is "busy," the calling party is apprised of such "busy" condition and can determine his further action accordingly. Similarly, if the remote called telephone station is not "answered", the calling party is apprised of this condition as well. Also, if the telephone switching system is unable to extend the transferred call to the remote called party, the calling party is made aware of this condition. Therefore, in accordance with this feature of the present invention, the calling party is informed of the progress of his telephone call without prematurely activating the telephone system tolling apparatus. This is in contradistinction to prior art call-diverter systems wherein the calling party either is charged immediately upon reaching the call-diverter station regardless of the completion of the transferred call, or is merely provided withh a continuous ringback signal in the event that the transferred call cannot be completed.

If the telephone conversation between the calling party and the transferred, called party is completed, as when either party was "hung up" or when the absence of an audio signal has been detected for a predetermined time interval, the disconnect control logic 140 supplies a relatively positive bias signal to the base electrode of the transistor 134. The transistor is thus rendered conductive to provide a short circuit connection to ground at the base electrode of the transistor 124. By supplying ground potential to the base electrode the transistor 124, this transistor is restored to its nonconductive state, thereby terminating the energizing current flowing through the relay energizing coil 128. This opens the outgoing line connecting switch 128a and, additionally, the relay contact 128b. Thus, the energizing voltage that had previously been supplied to the transistors 148, 170 and 226 is interrupted, as is the operating voltage that had previously been supplied to all of the illustrated SCRs. Accordingly, the illustrated call-diverter system is restored to its initial, quiescent condition to await a subsequent incoming telephone call to be transferred to the predetermined remote telephone station.

An additional feature which can be used in some telephone operating equipment with the present invention as a alternative embodiment comprises a low impedance DC termination of the incoming telephone line which is provided in response to an incoming ringing signal for a duration sufficient to activate the central office to terminate the ringing signal but not long enough to initiate the central office tolling appratus. This low impedance DC termination is comprised of a resistor 256 connected to an actuable switch 254a adapted to couple the resistor 256 across the incoming telephone line. The switch 254a may comprise an electromechanical switch, such as a relay, solenoid, or the like, controlled by, for example, a relay energizing coil 254. This relay energizing coil is included in the collector circuit of a relay driver transistor 252 which, in turn, is connected to the output of a one-shot circuit 250, such as a monostable multivibrator. As is known, a one-shot circuit is adapted to generate an output pulse of predetermined duration in response to an input trigger signal. The one-shot circuit 250 includes an input terminal connected to the collector of the aforedescribed transistor 124.

In operation, when the transistor 124 is rendered conductive in response to an incoming ringing signal, the collector voltage of the transistor is sufficient to supply an input trigger signal to the one-shot circuit 250, thereby energizing the one-shot circuit to apply a pulse of predetermined duration to the relay driver transistor 252. Now, current flows from the power supply output terminal 132 through the relay energizing coil 254 and through the collectoremitter junction of the transistor 252 for the duration of the output pulse produced by the one-shot circuit 250. Consequently, the switch 254 is closed to connect the low DC impedance resistor 256 across the incoming line conductors. This low DC impedance effectively terminates the incoming telephone line to cause the central office equipment to terminate the ringing signal. However, before the central office tolling apparatus is operated, the output pulse produced by the one-shot circuit is completed and the transistor 252 is rendered nonconductive to open the switch 254a. Hence, the incoming ringing signal is now interrupted and the remaining circuitry operates in the manner described hereinabove. Of course, when the switching contacts 228a and 228b finally close, the central office tolling apparatus is correspondingly initiated.

While the present invention has been particularly shown and described with reference to a preferred embodiment of a call-diverter, it should be readily apparent that various changes and modifications in form and details are contemplated. For example, the respective polarities of the illustrated transistors can be reversed, if desired, and individual PNP transistors can be substituted for NPN transistors, if preferred. Such substitution, of course, requires that appropriate changes in bias and operating voltage polarities be obtained. In addition, although SCR devices have been illustrated as comprising the various solid-state actuable switching elements, it is appreciated that other comparable switching devices can be used. Also, transistors can be substituted, where desired, for various ones of the SCR devices. It is, therefore, intended that the appended claims be interpreted as including the foregoing and all other such changes and modifications.

What is claimed is:

1. In a telephone call-diverter system for interconnecting an incoming telephone line to an outgoing telephone line so that an incoming telephone call can be transferred to a predetermined remote telephone station, apparatus for connecting said incoming and outgoing telephone lines to permit voice frequency communication therebetween, comprising:
   first switch means responsive to a detected ringing signal for completing a circuit from said call-diverter system to said outgoing line, said first switch means further enabling an energizing voltage to be supplied to a power supply terminal;
   dial control means for transmitting predetermined dialing signals to said outgoing line from said call-diverter system;
   second switch means responsive to the completion of the transmission of dialing signals to supply said energizing voltage to first and second time delay means to thereby energize said first and second time delay means, said first and second time delay means having different time delay characteristics such that said first time delay means generates a first actuating signal prior in time to a second actuating signal generated by said second time delay means;
   third switch means actuated in response to said first actuating signal for de-energizing said second time delay means to prevent said second actuating signal from being generated;
   answer signal detecting means for detecting an answer signal returned automatically to said call-diverter system over said outgoing line when said predetermined remote telephone station responds to said dialing signals transmitted thereto to thereby deactuate said third switch means and enable said second time delay means to generate said second actuating signal; and
   fourth switch means responsive to said second actuating signal for completing a circuit from said incoming line to said call-diverter system to thereby provide a communication channel between said incoming and outgoing lines.

2. The apparatus of claim 1 further comprising voice frequency transmission means connected in shunt relation to said fourth switch means for transmitting voice frequency signals therethrough between said incoming and outgoing lines independent of the completion of said circuit by said fourth switch means.

3. The apparatus of claim 2 wherein said voice frequency transmission means include capacitor means connected in a circuit parallel to said fourth switch means.

4. The appratus of claim 1 further comprising timing means having a predetermined time constant for producing a disconnect signal within a predetermined time after said first switch means responds to said ringing signal; said timing means being connected to said first switch means to supply said disconnect signal thereto to thereby interrupt said completed circuit from said call-diverter system to said outgoing line.

5. The apparatus of claim 4 wherein said timing means comprises an R-C network coupled to said power supply terminal and supplied with said energizing voltage; and fifth switch means actuated when said R-C network is electrically charged to a predetermined level for supplying said disconnect signal to said first switch means.

6. The apparatus of claim 1 wherein said answer signal detecting means comprises sixth switch means for supplying an energizing voltage to said third switch means; and means responsive to a predetermined answer signal applied to said outgoing line for controlling said sixth switch means to interrupt the supply of said energizing voltage from said third switch means.

7. The apparatus of claim 6 wherein said first and second time delay means comprise first and second charging circuits, respectively; said first charging circuit having a faster charging time than said second charging circuit and being coupled to said third switch means for supplying said first actuating signal thereto when electrically charged to a predetermined level; said second charging circuit being coupled to said third switch means and being inhibited thereby from reaching a predetermined charge level when said third switch means is actuated and supplied with said energizing voltage.

8. In a telephone call-diverter system wherein dialing signals are transmitted via an outgoing telephone line to establish a communication channel to a predetermined remote telephone station in response to an incoming telephone call received over an incoming telephone line, apparatus for establishing a DC connection to said incoming telephone line, comprising:
   first time delay means actuated in response to the completion of transmission of dialing signals for generating a connect energizing signal after a first time delay;
   second time delay means actuated in response to the completion of transmission of dialing signals for generating an inhibit energizing signal after a second time delay, said first delay being greater than said second time delay;
   connecting switch means responsive to said connect energizing signal for connecting said incoming telephone line to said telephone call-diverter system via a DC conduction path;
   inhibit switch means connected to said first time delay means and responsive to said inhibit energizing signal for inhibiting said first time delay means from generating said connect energizing signal; and
   disabling means for disabling said inhibit switch means when a predetermined condition of said outtgoing telephone line is sensed, to thereby permit said first time delay means to generate said connect energizing signal.

9. The apparatus of claim 8 wherein each of said first and second time delay means comprises a charging circuit actuated to be charged to a predetermined level, whereby the respective energizing signals are generated when said respective predetermined levels are attained.

10. The apparatus of claim 9 wherein said inhibit switch means comprises actuable clamp means coupled to said first charging circuit for clamping the charge level of said first charging circuit to a value less than said predetermined level.

11. The apparatus of claim 10 wherein said clamp means comprises controlled rectifier means for connecting said first charging circuit to a reference potential and having a control input terminal coupled to said second charging circuit to receive said inhibit energizing signal therefrom.

12. The apparatus of claim 11 wherein said disabling means comprises means for selectively supplying an operating potential to said controlled rectifier means such that said operating potential is interrupted when said predetermined condition of said outgoing telephone line is sensed.

* * * * *